H. J. KEATING.
CHECK CONTROLLED APPARATUS.
APPLICATION FILED SEPT. 19, 1910.
1,137,631.
Patented Apr. 27, 1915.
4 SHEETS—SHEET 1.
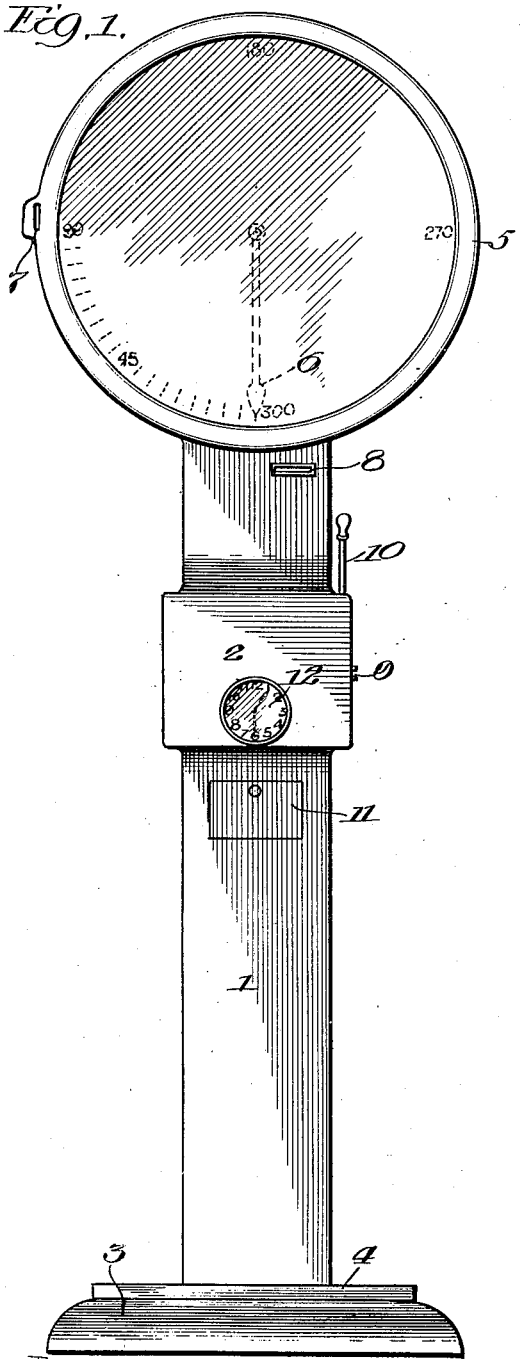
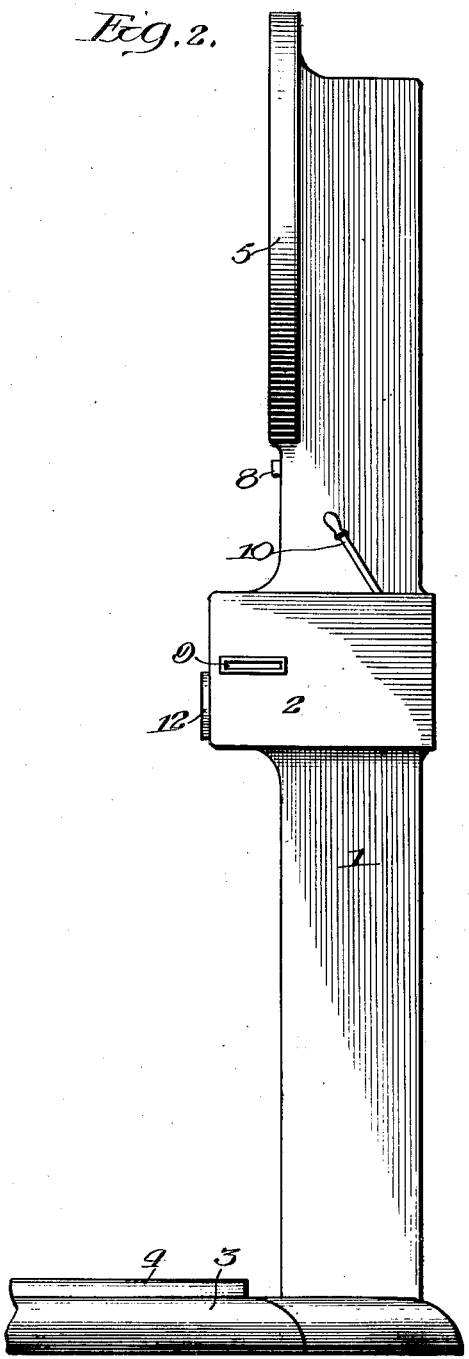
Witnesses
O. M. Nimich
R. L. Jones.
Inventor
Harry J. Keating
by Max W. Zabel Atty

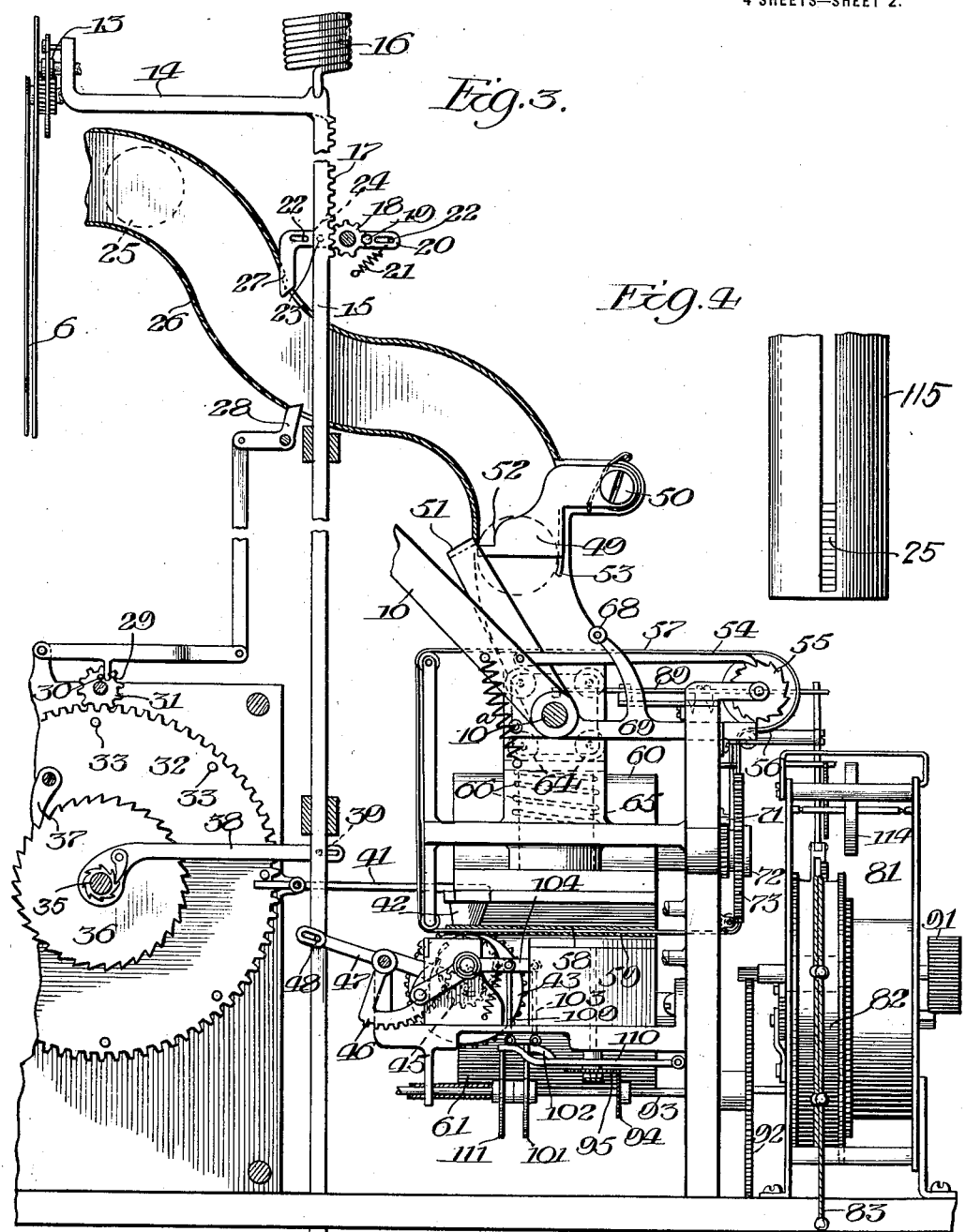

H. J. KEATING.
CHECK CONTROLLED APPARATUS.
APPLICATION FILED SEPT. 19, 1910.
1,137,631.
Patented Apr. 27, 1915.
4 SHEETS—SHEET 3.
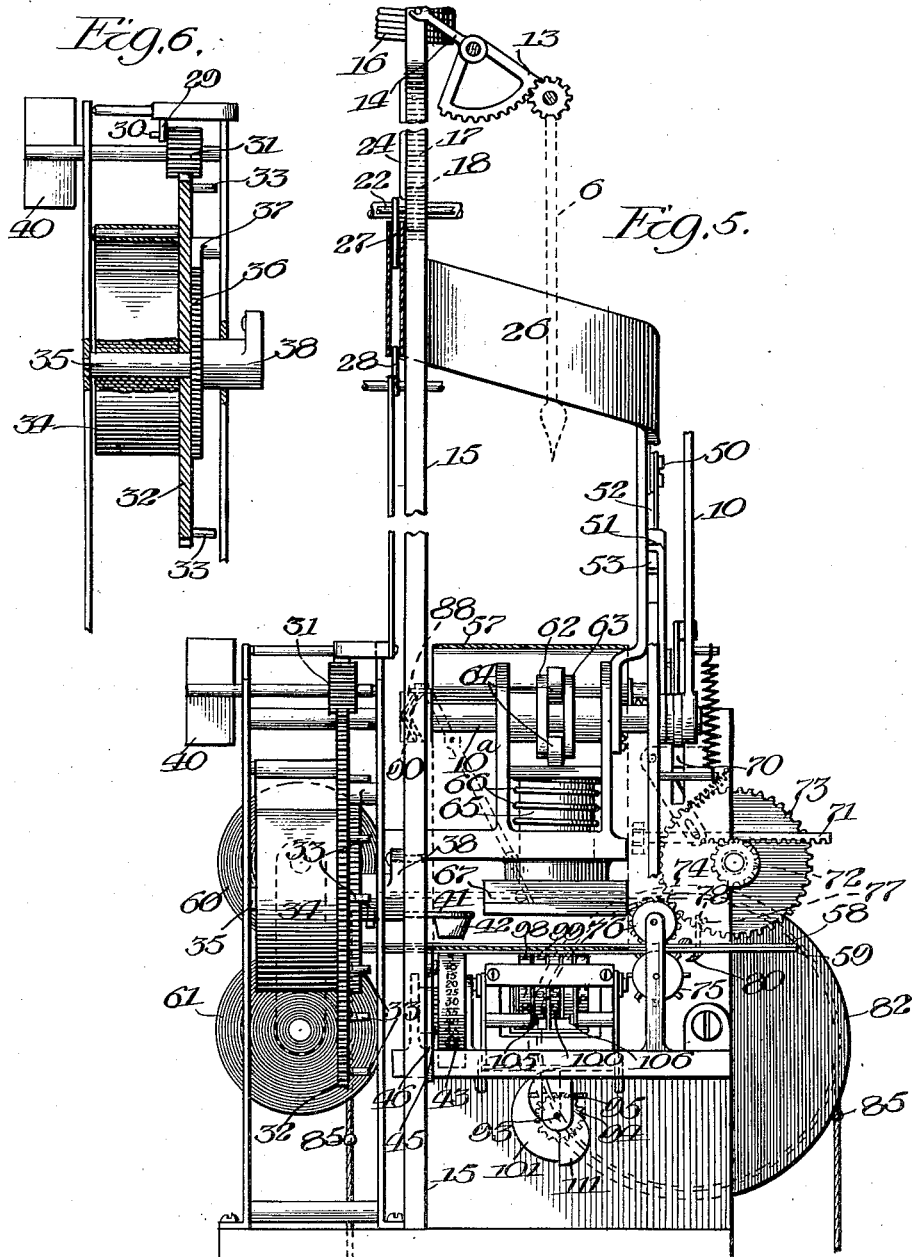

H. J. KEATING.
CHECK CONTROLLED APPARATUS.
APPLICATION FILED SEPT. 19, 1910.
1,137,631.
Patented Apr. 27, 1915.
4 SHEETS—SHEET 4.
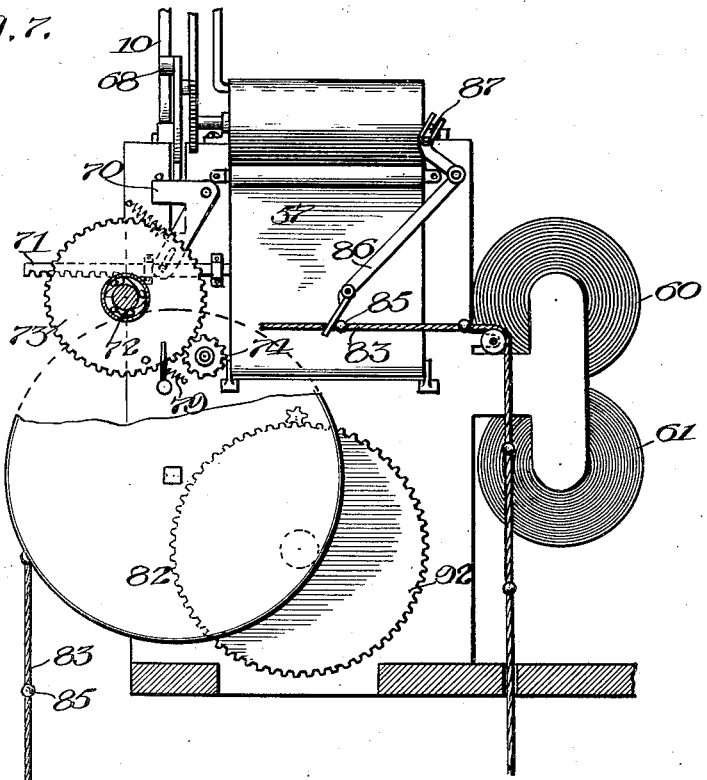
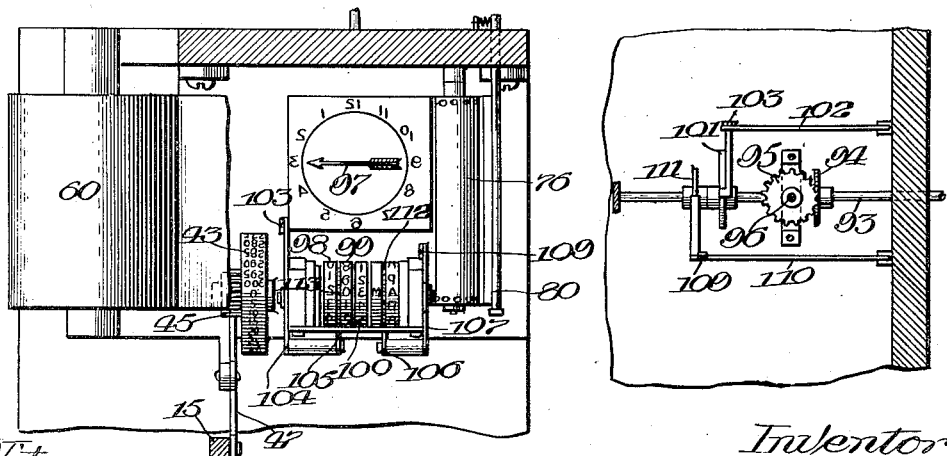
Witnesses
C. M. Wernick
A. L. Jones
Inventor
Harry J. Keating
by Max W. Zabel
atty

UNITED STATES PATENT OFFICE.

HARRY J. KEATING, OF CHICAGO, ILLINOIS, ASSIGNOR TO VENN MANUFACTURING COMPANY, OF CHICAGO, ILLINOIS, A CORPORATION OF ILLINOIS.

CHECK-CONTROLLED APPARATUS.

1,137,631. Specification of Letters Patent. Patented Apr. 27, 1915.

Application filed September 19, 1910. Serial No. 582,775.

*To all whom it may concern:*

Be it known that I, HARRY J. KEATING, a citizen of the United States, residing at Chicago, in the county of Cook and State of Illinois, have invented a certain new and useful Improvement in Check-Controlled Apparatus, of which the following is a full, clear, concise, and exact description, reference being had to the accompanying drawings, forming a part of this specification.

My invention relates to check controlled apparatus and has for its object the provision of an improved device of this nature which finds specific application in an insurance vending machine for instance, and I describe it in connection with an insurance vending machine in this application, although of course not limiting my invention to such use.

In the preferred form as so applied my invention is designed to provide means whereby upon the deposit of a check or coin a ticket may be released from a machine which assures to the depositor insurance protection preferably for a period of twenty-four hours, and which ticket at the same time carries an indication of the weight of the depositor. It is of great importance that the depositor be properly identified so as to avoid spurious actuation of the machine by one other than the depositor whereby it may be possible to fraudulently collect insurance. In the form shown the depositor receives two tickets from the machine, one of which is signed by him and returned to the machine, but I rely mainly for proper identification upon the appliances set forth herein, in which the depositor steps upon a weighing platform or scale platform, and upon the deposit of the check receives the slips of paper or tickets properly stamped with the weight of the said depositor.

I have shown my invention herein as applied more particularly to the insurance vending machine set forth in my application, Serial No. 516,455, filed September 7, 1909.

I will explain my invention more in detail by reference to the accompanying drawings illustrating one embodiment of my invention, in which—

Figure 1 is a front view of a machine constructed in accordance with my invention; Fig. 2 is a side view thereof; Fig. 3 is a view of the interior mechanism illustrating the weight recording devices; Fig. 4 is a detail view of the slot wherein the coins are deposited; Fig. 5 is a side view of the mechanism illustrated in Fig. 3; Fig. 6 is a detail view of the weight controlling clock mechanism; Fig. 7 is a detail view of the clock mechanism controlling the time stamp; Fig. 8 is a detail view of the printing mechanism; and Fig. 9 is a detail view of the setting mechanism.

Referring more particularly to Fig. 1 I show a casing 1, having a second casing 2 within which the time stamp and printing mechanism are located. The base of the machine 3 carries a weighing platform 4, and the top of the casing 1 ends in a dial 5 having a pointer 6 to indicate the weight of the person standing upon the platform 4. A slot 7 is adapted to receive the checks as they are deposited within the machine. A slot 8 is provided, into which the tickets as received from the machine and signed by the operator are to be deposited. A slot 9 is provided through which the tickets or strips of paper as stamped by the machine after the deposit of the check are projected to be received by the operator. A handle 10 is designed for contra-clockwise operation, referring to Fig. 2, at the hands of the operator to actuate the mechanism within the machine upon the deposit of the check. A door 11 is provided to remove the coins periodically. A clock 12 is provided upon the casing 2 to indicate to the operator the time of day at which he receives the ticket, and this clock is operated by means of the time stamping mechanism arranged within the machine.

Referring more particularly to Figs. 3 and 5 the pointer 6 is actuated through the interposition of gear mechanism 13, through the agency of an arm 14 mounted upon the rod 15 which connects the weighing platform, as is well understood, with a spring arrangement 16. The spring 16 is designed to permit movement of the bar 15 in proportion to the weight of the person standing upon the platform 4. The bar 15 has a rack 17 which is designed to be engaged by a pinion 18, which pinion is normally prevented from rotation by a pin 19 carried by an oscillating arm 20 which is retracted by the spring 21. Pins 22 define the movement of the arm 20. A pin 23 is provided upon the arm 20 and is designed to engage a cam 24 upon the bar 15 so that when the said arm 20 has been moved to the right of Fig. 3 and the said bar 15 lowered by reason of some one standing upon the platform 4 the said arm 20 cannot return to its gear locking position until the cam 24 has left the pin 23 free to thereby permit the spring 21 to again place the arm 20 in the position shown in Fig. 3. When the check 25 is deposited within the tube 26 it strikes the depending prong 27 of the arm 20 to thereby move it to the right and permit the scale arm 15 to move under the pressure of the person operating the device. The coin then in its further movement actuates a bell crank lever 28 to thereby release the ratchet 29 from engagement with a pin 30 upon a pinion 31 to thereby permit the gear wheel 32 carrying the pins 33 to rotate in a clockwise direction through the agency of the clock mechanism associated therewith. This clock mechanism consists of a spring 34 fastened to the shaft 35, which shaft also carries the ratchet wheel 36. A pawl 37 mounted upon the wheel 32 serves to move said wheel 32 under the influence of the spring, when the said wheel 32 is released and permitted to move by the withdrawal of the detent 29 from the pin 30, provided upon the gear wheel 31. A crank 38 is connected with the shaft 35 in such manner that when said crank 38 moves downwardly in response to the actuation of the pin 39, it serves during this downward motion to wind the spring 34, but does not move the shaft when the said crank moves upwardly as is well understood. A governor 40 is provided to control the actions of the clock mechanism. It will be seen that when the detent 29 is released it permits the gear wheel 31 to make a complete rotation to thereby permit the gear wheel 32 to rotate a distance equal to the distance between two adjacent pins 33. When the gear wheel 32 rotates one of the pins 33 engages an arm 41 carrying a weighted hammer 42, and permits it to fall upon a type wheel 43 to thereby imprint upon two sheets of paper 58, 59 the indications of the wheel 43 opposite the said hammer. The wheel 43 through the interposition of suitable gear mechanism 45 including a segmental gear 46, is operated by an arm 47 which engages a pin 48 provided upon the bar 15. The indications of the type wheel 43 and the arrangements of the gear mechanism are such that the number upon the type wheel appearing opposite the hammer corresponds to the weight of the person standing upon the platform 4 and corresponds to the indications of the arm 6. It will thus be seen from what has been described that a person depositing a coin or check within the tube 26 receives an indication upon the dial 5 of his weight and also starts mechanism in operation which winds the clock mechanism designed to operate the type wheel 43 and also starts mechanism in operation to print the indications of said type wheel upon the said two sheets of paper. The coin in its further progress through the machine rests upon a coin carrier 49 rotatably mounted at 50 which coin carrier normally prevents through the agency of the supplemental arm 51, engaging the service 52, the actuation of the lever 10 by the operator. When the coin is in place, however, upon the coin carrier from which it is normally prevented from falling by the tongue 53, the arm 51 engages the coin and thereby permits rotation of the handle 10 in contra-clockwise direction to thereby rotate the coin carrier and permit the coin to fall therefrom into a tube 115. The handle 10 operates the remaining mechanism of the machine, which mechanism is the same as that described in my co-pending application to which reference has been made.

When the controlling lever 10 is actuated, it actuates a pawl 54, which rotates periodically the ratchet wheel 55, which by means of the friction roller 56 rotates the inking ribbon 57 around the machine transversely to the movement of the paper which is fed in two sheets 58 and 59 from the rolls 60 and 61, which sheets pass out of the machine to be received by the operator of the machine. One sheet the operator keeps and the other he signs and returns to the slot 8. The actuation of the controlling lever 10 likewise rotates the shaft 10ª which thereby rotates the two parallel plates 62 and 63 which carry four rollers 64, 64. The plates 63 and the rollers 64 are fastened together and respond to a contra-clockwise rotation of the controlling lever 10, but do not return when the lever is returned to its normal position, due to any suitable form of ratchet mechanism interposed between said shaft 10ª and said plates and rollers.

It will be seen that when the plates with their rollers are rotated, they depress a plunger 65 which is held upwardly through the agency of a spring 66, and thereby depress the hammer 67 against the sheets of paper 58 and 59 between which is interposed the ribbon 57, and against the character wheels to be explained hereinafter, thereby causing a registration upon both pieces of paper. Before the arm 10 has completed its motion in a clockwise direction, but after the registration upon the paper has been made and the plates 62 and 63 with the wheel 64 have again occupied their normal position having passed beyond the dead center mark in their rotation and thus being impelled to their normal position by the spring 66, said arm 10 engages a roller 68 upon a hinged bracket 69, which hinged bracket engages a bell crank lever 70 shown more clearly in Figs. 4 and 5, which bell crank lever actuates a rack 71 which operates a ball ratchet 72, thereby rotating the gear wheel 73 and the pinion 74, which pinion, as appears more clearly from Fig. 4, rotates male and female interlocking wheels 75, and 76, which engage the paper sheets 58 and 59 and propel them through the machine. It requires one complete rotation of the gear wheel 73 to propel a piece of paper of the right size through the machine. And when said wheel 73 has made its complete rotation, a pin 77 has engaged a lever 78 acting against a spring 79, which lever 78 operates a knife 80, thus to cut off the paper the required length from the sheet 59 and permit it to be taken by the operator of the machine.

The machine is provided with a clock mechanism 81 which instead of a spring, has a sheave 82 which is operated by means of a rope 83 having weights 84 at its extremities, only one of which is shown, one of which is of course considerably heavier than the other, the function of one being simply to maintain said rope taut, and the surplus of weight of one of the weights, which in this case is the right hand weight 84 of Fig. 5, serves to drive the clock mechanism. To draw the weight 84 into its upper position so that it can operate the clock mechanism, the rope 83 is provided with circular attachments 85 or bulbs, which are adapted for engagement by means of an arm 86 actuated by a lever 87, which lever is under the control of a cam 88. The bar 86 is adapted for a sort of sweeping engagement with the bulbs 85. Thus when said bar 86 is traveling toward the right, looking at Fig. 5, it winds up the left hand weight 84 by engaging the associated bulb 85 and this movement of the bar 86 is in response to the cam 88. Now when the reverse operation of bar 86 takes place it is permitted to slide over the bulb 85 which will be immediately following the one upon which it has just acted, and by falling behind said bulb, will keep on propelling said bulbs forwardly to keep the weight 84 properly wound up to serve as clock-actuating means. The lever 87 is operated as shown more clearly in Fig. 3 by means of the link 89 which finally engages the cam 88 through the interposition of the pin 90, which link 89 is pivoted intermediate of its ends. The clock mechanism has a suitable regulating wheel 91 whereby the time can, if necessary, be periodically regulated. The clock mechanism ultimately actuates a wheel 92 which makes a rotation once in every twenty-four hours. This wheel 92 is fastened to a shaft 93 which has a pinion 94 engaging a second pinion 95 geared 1 to 2, which, through the interposition of a shaft 96 actuates the arrow 97 of the time-stamping device, which arrow travels around the circumference of the circle about which the numerals running from 1 to 12 to indicate the hours are placed, as more clearly shown in Fig. 8.

In a parallel plane with the time-stamping device is a numbering or counting device which is adapted to stamp the number of the day upon which the device is actuated, as stated previously. This counting mechanism consists of the three upper wheels 98, 99, and 100 which are actuated once each day by the cam 101, which cam, as will be noticed, causes an actuation, once every twenty-four hours, of the cam lever 102 which is suitably supported by a link 103, through the interposition of a link 104 which operates the pawl 105 to give impulse to the counting mechanism each day. A second pawl 106 carried by the lever 107 is controlled through the interposition of the arm 109, and cam lever 110 by the cam 111 which cam causes an actuation of its cam lever as will be seen, twice in every twenty-four hours. This second pawl 106, through the interposition of the ratchet wheel 112, operates the wheel marked A. P. A., etc., which thereby specifies whether the indication of the arrow 97 of the hour was caused during the forenoon or afternoon, A. M. or P. M. respectively, the wheel containing the M. being permanently fixed so as not to rotate. A ratchet wheel 113 is likewise under the control of the pawl 105. Suitable escapement mechanism 114 is provided to govern the operation of the clock mechanism 81, and a suitable framework, as shown, although not specifically described, supports and carries the various operating devices.

While I have herein shown and particularly described the preferred embodiment of my invention, I do not mean to limit myself to the precise construction and arrangement as herein set forth, but

Having thus described my invention, what I claim as new and desire to secure by Letters Patent is:

1. A machine of the character described having a weight responsive device, means whereby said device is normally held against operation, means for releasing said holding means to permit it to give an indication, and means operable when said device is released to cause a record to be made of the indication of said device, said last aforesaid means including a striking element adapted to engage said weight responsive device, and a clock mechanism to actuate said striking element.

2. A machine of the character described having a weight responsive device, means whereby said device is normally held against operation, means for releasing said holding means to permit it to give an indication, and means operable when said device is released to cause a record to be made of the indication of said device, said last aforesaid means including a striking element adapted to engage said weight responsive device, a clock mechanism to actuate said striking element, and a lever for periodically starting said clock mechanism in motion.

3. A machine of the character described having a weight responsive device, means whereby said device is normally held against operation, means for releasing said holding means to permit it to give an indication, and means operable when said device is released to cause a record to be made of the indication of said device, said last aforesaid means including a striking element adapted to engage said weight responsive device, a clock mechanism to actuate said striking element, and means under the control of said weight responsive device to wind said clock mechanism.

In witness whereof, I hereunto subscribe my name this 3rd day of September A. D., 1910.

HARRY J. KEATING.

Witnesses:
 A. LYDA JONES,
 HAZEL JONES.